US006966957B2

(12) United States Patent
Tsuchihashi (10) Patent No.: US 6,966,957 B2
(45) Date of Patent: Nov. 22, 2005

(54) BONDING METHOD FOR A PLURALITY OF COMPONENTS, BONDING METHOD FOR CONTAINER AND LID MEMBER, AND ULTRASONIC WELDING APPARATUS

(75) Inventor: Kazuo Tsuchihashi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/817,801

(22) Filed: Apr. 6, 2004

(65) Prior Publication Data
US 2005/0045266 A1 Mar. 3, 2005

(30) Foreign Application Priority Data
Apr. 9, 2003 (JP) .............................. 2003-105218

(51) Int. Cl.[7] ............................................. B29C 65/08

(52) U.S. Cl. .................... 156/69; 156/73.1; 156/580.1; 156/580.2

(58) Field of Search ...................... 156/69, 73.1, 580.1, 156/580.2, 64; 264/442, 443, 445; 425/174.2; 228/110.1, 1.1

(56) References Cited

U.S. PATENT DOCUMENTS

| | | | |
|---|---|---|---|
| 3,976,240 A | | 8/1976 | Matrisian ..................... 228/5.1 |
| 4,411,720 A | * | 10/1983 | Sager ........................... 156/69 |
| 4,595,117 A | | 6/1986 | Walter ......................... 220/359 |
| 4,750,955 A | * | 6/1988 | Haguenier .................... 156/69 |
| 5,316,603 A | * | 5/1994 | Akazawa et al. ............. 156/69 |
| 5,989,370 A | | 11/1999 | Wannebo .................... 156/73.1 |

FOREIGN PATENT DOCUMENTS

| | | |
|---|---|---|
| JP | 62-26991 | 2/1987 |
| JP | 62-46618 | 2/1987 |
| JP | 2-43631 | 2/1990 |
| JP | 6-43099 | 2/1994 |

\* cited by examiner

Primary Examiner—James Sells
(74) Attorney, Agent, or Firm—Fitzpatrick, Cella, Harper & Scinto (57) ABSTRACT

According to a bonding method of heat-welding a plurality of components in a predetermined lengthwise direction by vibration of an ultrasonic vibrator, the plurality of components are fixed such that their bonding positions are aligned, the ultrasonic vibrator is oscillated, and the plurality of components and ultrasonic vibrator are moved relative to each other in the lengthwise direction, thus performing heat welding.

8 Claims, 10 Drawing Sheets

BONDING METHOD FOR A PLURALITY OF COMPONENTS, BONDING METHOD FOR CONTAINER AND LID MEMBER, AND ULTRASONIC WELDING APPARATUS

FIELD OF THE INVENTION

The present invention relates to a bonding method for a plurality of components.

The present invention also relates to a method of bonding the lid member of a container to the container.

The present invention also relates to a technique for bonding by heating caused by vibration and oscillation of an ultrasonic vibrator.

The present invention also relates to an ultrasonic welding apparatus which heat-welds a plurality of components, e.g., a container and lid member, by using ultrasonic vibration.

BACKGROUND OF THE INVENTION

As a bonding method and apparatus which weld a plurality of components to each other by heating them utilizing ultrasonic vibration and oscillation, for example, one disclosed in, e.g., Japanese Patent Publication (KOKOKU) No. 62-26991 for opposition is known.

Japanese Patent Publication (KOKAI) No. 62-46618 discloses use of sound wave connection in a method of forming a lip sealing surface around a thermoformed plastic container.

Japanese Patent Publication (KOKOKU) No. No. 2-43631 for opposition discloses a technique for ultrasonic connection of parallel webs.

U.S. Pat. Nos. 5,989,370 and 3,976,240 describe ultrasonic welding apparatuses.

Japanese Patent Publication (KOKOKU) No. 6-43099 for opposition discloses a technique which utilizes ultrasonic vibration as a plastic container manufacturing method.

When a plurality of components are to be welded and bonded to each other by dielectric heating in accordance with ultrasonic oscillation, an ultrasonic vibrator for a portion to be bonded must be machined to match the shape of the bonding place.

When the area of the bonding portion is large or the bonding portion is long, the machining shape of the ultrasonic vibrator becomes complicated. When the bonding target is changed, a new ultrasonic vibrator must be prepared.

SUMMARY OF THE INVENTION

It is an object of the present invention to provide a bonding method that can cope with a change in the shape, size, or formation of a container when the opening of the container is to be closed with a lid member.

According to the present invention, the above problems are solved by proposing a bonding method for a plurality of components, of heat-welding the plurality of components in a predetermined lengthwise direction by vibration of an ultrasonic vibrator, characterized in that the plurality of components are fixed such that bonding positions thereof are aligned, the ultrasonic vibrator is oscillated, and the plurality of components and the ultrasonic vibrator are moved relative to each other in the lengthwise direction, thus performing heat welding.

According to one aspect of the present invention, a bonding method for a plurality of components is proposed, characterized in that the plurality of components are fixed in the lengthwise direction with a plurality of fixing members, and as the ultrasonic vibrator moves, the fixing members are retreated from the bonding positions.

Another aspect is proposed, characterized in that the fixing members retreated from the bonding positions are returned, and fix a portion which is heat-welded by the ultrasonic vibrator.

According to the present invention, a bonding method for a plurality of components, of heat-welding a plurality of components in a predetermined lengthwise direction by vibration of an ultrasonic vibrator is proposed, characterized in that the components are fixed in the predetermined longitudinal direction with a plurality of fixing members that fix the components, the ultrasonic vibrator is operated to move from a welding start position in the predetermined lengthwise direction, and as the ultrasonic vibrator moves, the fixing members are retreated from fixing positions.

A bonding method for a container and lid member, of closing an opening of the container with the lid member is proposed, characterized in that the lid member is placed over the opening of the container, an ultrasonic vibrator is brought into contact with the lid member and is oscillated in order to bond a periphery of the opening, and the container or the ultrasonic vibrator is moved relative to the periphery of the opening, thus performing heat welding.

A bonding method for a container and lid member is proposed, characterized in that the lid member placed over the container is fixed at prospective bonding positions with a plurality of fixing members, and the fixing members are retreated from the prospective bonding positions in accordance with movement of the ultrasonic vibrator.

A bonding method for a container and lid member is proposed, characterized in that the fixing members retreated from the prospective bonding positions are returned to the prospective bonding positions after heat welding by means of ultrasonic vibration.

A bonding method for a container and lid member, of closing an opening of the container with the lid member is proposed, characterized in that when the lid member is to be placed over the opening of the container, the ultrasonic vibrator is to be brought into contact with the lid member and is to be oscillated in order to bond a periphery of the opening, and the container or the ultrasonic vibrator is to be moved relative to the periphery of the opening when performing heat welding, a relative moving speed in the vicinity of a bonding end position of the opening is decreased.

According to still another element of the present invention, an ultrasonic welding apparatus for heat-welding a plurality of components by oscillation of an ultrasonic vibrator is proposed, characterized by comprising a plurality of fixing means for fixing the plurality of components at prospective welding positions, and means for retreating the fixing means from the prospective welding positions during movement of the ultrasonic vibrator to the prospective welding positions.

An ultrasonic welding apparatus is proposed, characterized by comprising means for returning the fixing means to fixing positions after heat welding at the prospective welding positions.

According to an aspect of the present invention, an ultrasonic welding apparatus is characterized by comprising control means for decreasing a moving speed of the ultrasonic vibrator before a prospective welding end position when the prospective welding positions form a closed loop.

Other features and advantages of the present invention will be apparent from the following description taken in conjunction with the accompanying drawings, in which like

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS (First Embodiment)

FIGS. 1 to 6 are views for explaining the first preferred embodiment to which the present invention is applied.

Figure 1:
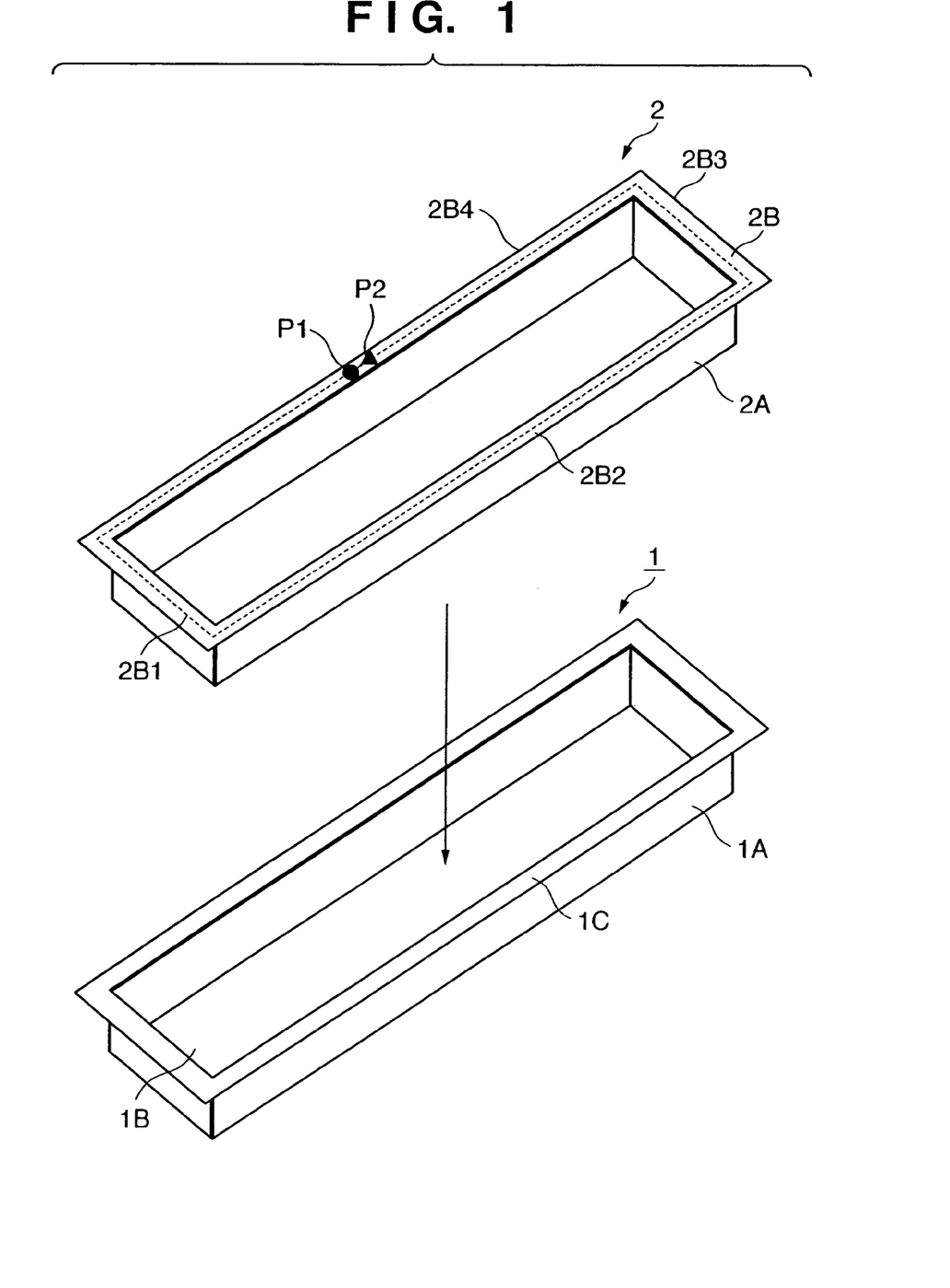
FIG. 1 is a view for explaining a container and lid member to which the present invention is applied.

FIG. 1 shows a container main body 1 for storing a to-be-stored object, and a lid member 2.

The container main body 1 is made of a high-impact strength polystyrene resin (HIPS) having a melting point of 80° C. to 90° C.

The lid member 2 is made of a high-impact strength polystyrene resin having a melting point of 80° C. to 90° C.

The container main body 1 has a storing portion 1A and opening 1B. A brim 1C to which the lid member 2 is to be bonded is formed around the opening 1B.

The lid member 2 has a lid 2A which is to be placed over the opening 1B of the container main body 1 in order to close the opening 1B, and a brim 2B which overlaps the brim 1C of the container main body 1.

The brim 2B of the lid member 2 has a width of 5.0 mm and a thickness of 1.5 mm.

The brim 1C of the container main body 1 has a width of 5.0 mm and a thickness of 1.5 mm. The long-side portion of the brim 2B of the lid member 2 is 220-mm long, and its short-side portion is 60-mm long.

Figure 2:
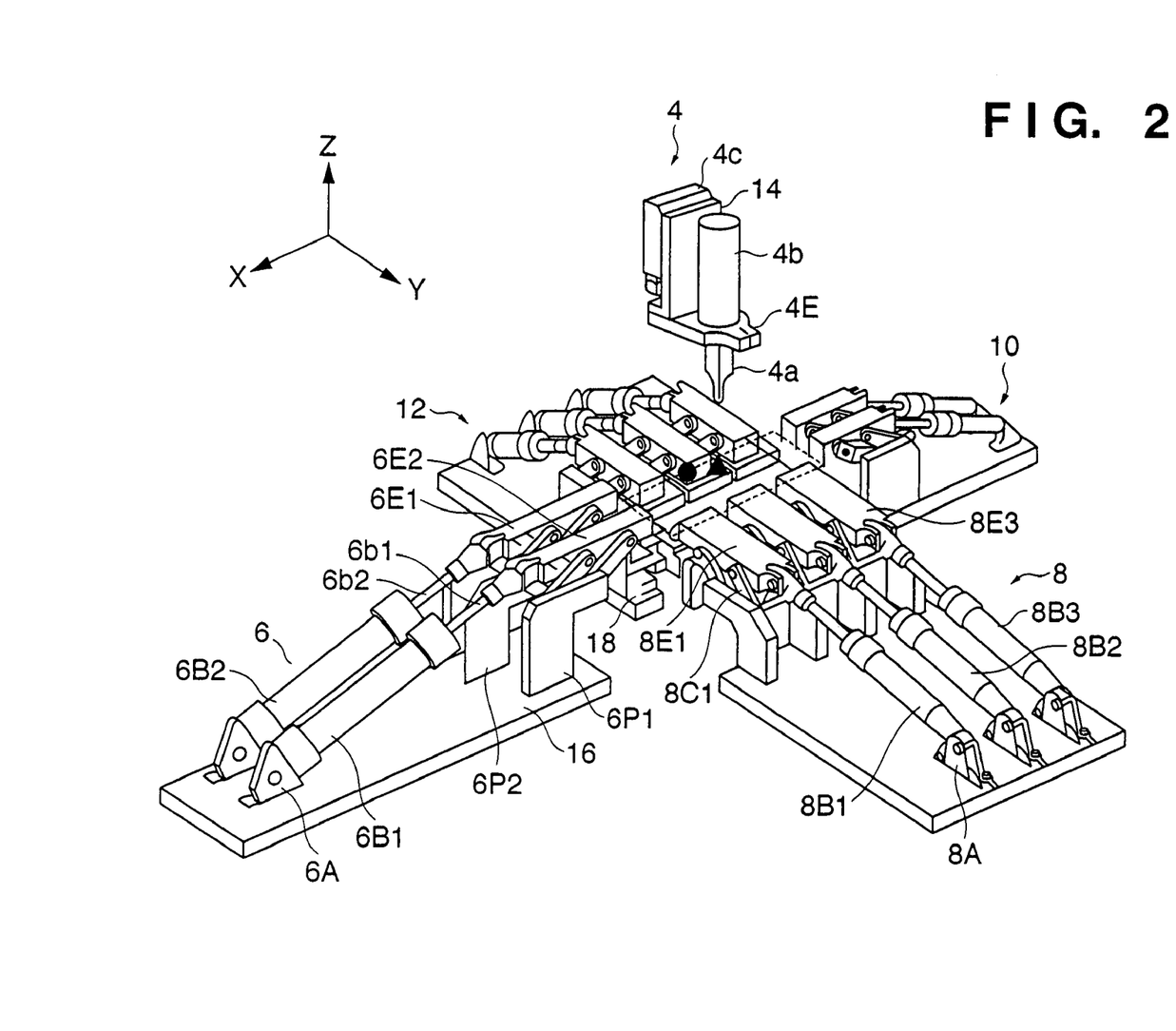
FIG. 2 is a view for explaining the arrangement of an ultrasonic welding apparatus.

FIG. 2 is a view showing the arrangement of an ultrasonic welding apparatus according to the present invention.

Referring to FIG. 2, reference numeral 4 denotes an ultrasonic welding means; and 6, 8, 10, and 12, holding means for holding the container main body 1 and lid member 2.

The ultrasonic welding means 4 includes a vibrator 4a for ultrasonic oscillation, a vibration generating means 4b for oscillating the vibrator 4a by ultrasonic vibration, a control means 4c for controlling the vibration generating means 4b, and the like.

The vibrator 4a is made of a titanium alloy, and has a length of 60 mm and a contact portion area of 36 mm$^2$.

The ultrasonic welding means 4 moves the vibrator 4a with a moving means 14 along a closed-loop moving locus as indicated by a broken line shown in FIG. 2.

Figure 3:
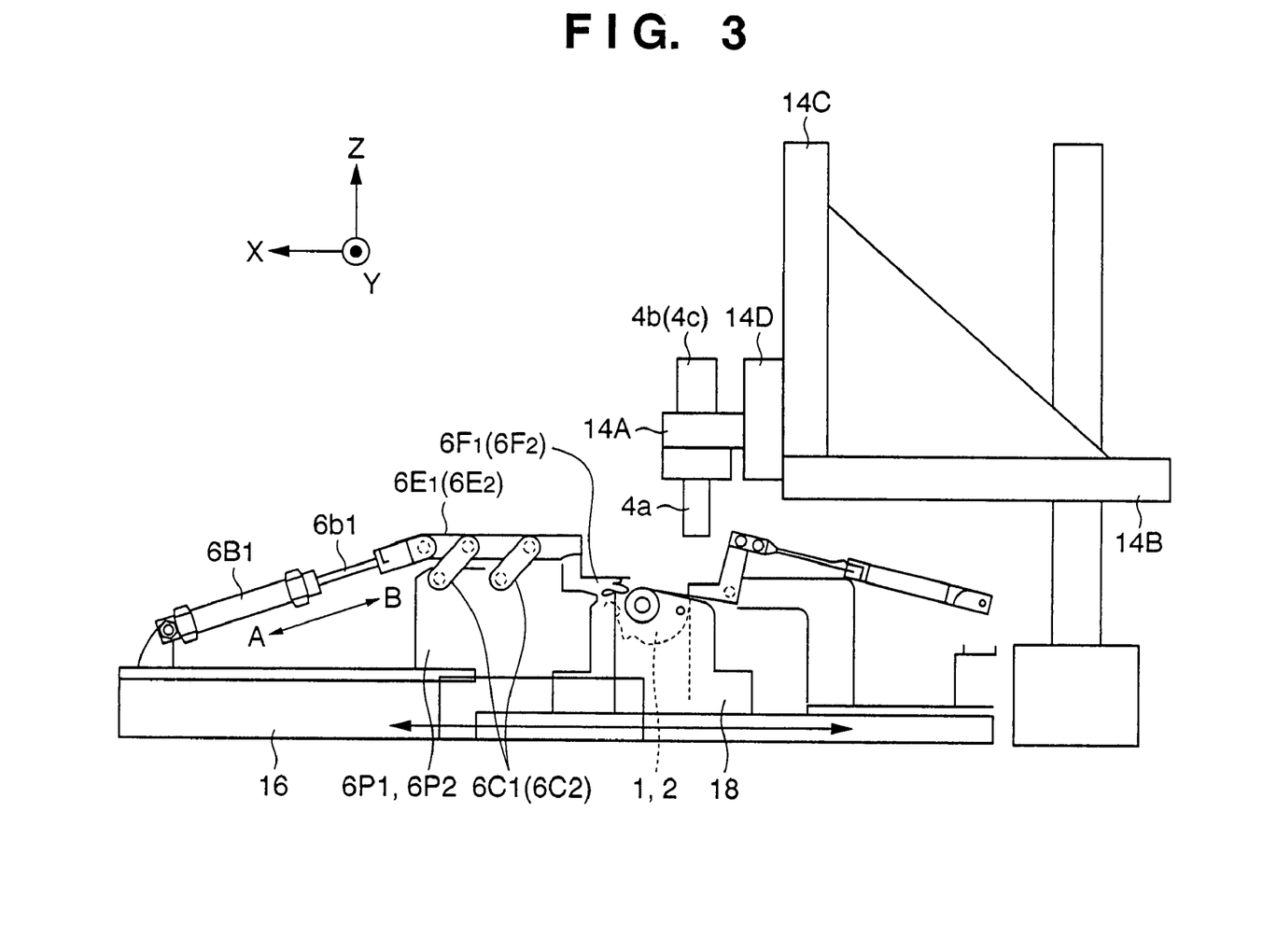
FIG. 3 is a view for explaining the arrangement of the ultrasonic welding apparatus.

The moving means 14 is formed by attaching the ultrasonic welding means 4 to a moving member 14A, as shown in FIG. 3.

The moving member 14A is attached to a guide roller 14D in a Y-axis direction, and the Y-axis guide roller 14D is attached to a guide roller 14C in a Z-axis direction.

The Z-axis guide roller 14C is attached to a slide guide 14B in an X-axis direction.

The lid member 2 is placed over the opening 1B of the container main body 1. The brim 1C of the container main body 1 and the brim 2B of the lid member 2 are overlaid on each other. Then, the resultant work is placed on a work holding means 18 on a fixing base 16 shown in FIG. 3.

Referring to FIG. 2, the holding means 18 presses and holds the container main body 1 on which the lid member 2 is placed. The work holding means 18 presses the brim 2B, on one of the four surfaces of the lid member 2, with a press member.

The arrangement of the holding means 6 will be described with reference to FIGS. 2 and 3.

Reference numeral 6A denotes an attaching base for the holding means 6 and is fixed on the fixing base 16.

Reference numerals 6B1 and 6B2 denote two air cylinders arranged on the attaching base 6A. Link means 6C1 and 6C2 are attached to pistons 6b1 and 6b2 of the air cylinders 6B1 and 6B2, respectively.

The link means 6C1 and 6C2 are supported by holding members 6P1 and 6P2, and are connected to arm members 6E1 and 6E2, respectively. Press members 6F1 and 6F2 are attached to the distal ends of the arm members 6E1 and 6E2, respectively.

After the lid member 2 is placed over the container 1 shown in FIG. 1 and the resultant work is placed on the holding member 18 which holds the work (the container 1 and lid member 2) shown in FIG. 3, the press members 6F1 and 6F2 press and hold a side 2B1 of the brim 2B of the lid member 2 shown in FIG. 1 at two portions.

In the holding means 8, three air cylinders 8B1, 8B2, and 8B3 are arranged on a fixing base 8A. The holding means 8 has three link means 8C1, 8C2, and 8C3, three arm members 8E1, 8E2, and 8E3, and three press members 8F1, 8F2, and 8F3 (not shown). The arrangement of the holding means 8 is identical to that of the holding means 6.

The holding means 8 presses and holds one side 2B2 in the longitudinal direction of the brim 2B of the lid member 2 with the three press members.

The holding means 10 and 12 have arrangements identical to that of the holding means 6, and press and hold sides 2B3 and 2B4, respectively, of the brim 2B of the lid member 2.

The operations of the air cylinders of the holding means 6, 8, 10, and 12 are controlled by control means.

The press force of the press members acting on the lid member 2 is 5.0 kgf/cm$^2$.

(Explanation on Ultrasonic Welding Operation)

The operation of ultrasonic welding according to this embodiment will be explained.

A to-be-stored object X such as a liquid, powder, or solid is stored in the container main body 1. The lid member 2 is placed over the container main body 1. The brim 1C of the container and the brim 2B of the lid member 2 are overlaid on each other to close the lid. The resultant work is placed on the work holding member 18 of the welding apparatus.

Since the pistons of the air cylinders of the holding means 6 are located along the direction of an arrow A shown in FIG. 3, the respective press members are positioned at retreat positions by the link mechanism, so that the work can be set on the work holding member 18.

The container main body 1 with the closed lid member 2 is set on the work holding member 18. The air cylinders of the holding means are actuated by the control means. When the link means actuate, the respective press members hold the brims 2B and 1C of the lid member 2 and lid member 2 in a pressed state.

The broken line from a start point ● to an end point ▲ indicates the welding locus of ultrasonic welding.

When the work (lid member 2 and container main body 1) is set on the work holding member 18 and the respective air cylinders actuate the press members to hold the brims 2B and 1C of the lid member 2 and container main body 1 being overlaid on each other, preparation for welding operation is completed.

Figure 4:
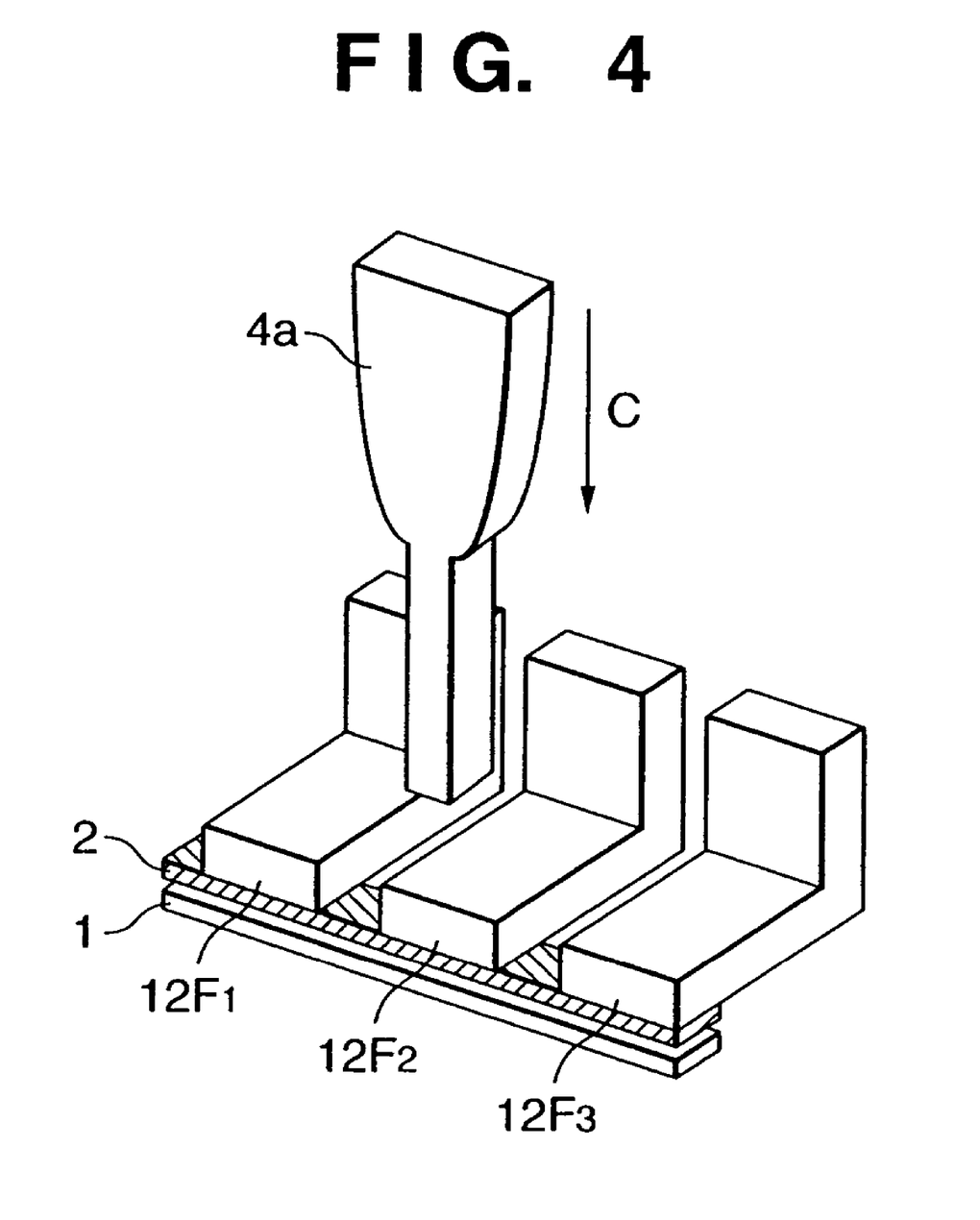
FIG. 4 is a view for explaining operation.

The ultrasonic welding means 4 is moved by the moving means 14 to the ● position as the welding start position (see FIG. 4).

Accordingly, a press member 12F2 at the center of the three press members of the holding means 12 is retreated from the press position by the operation of the air cylinder.

Figure 5:
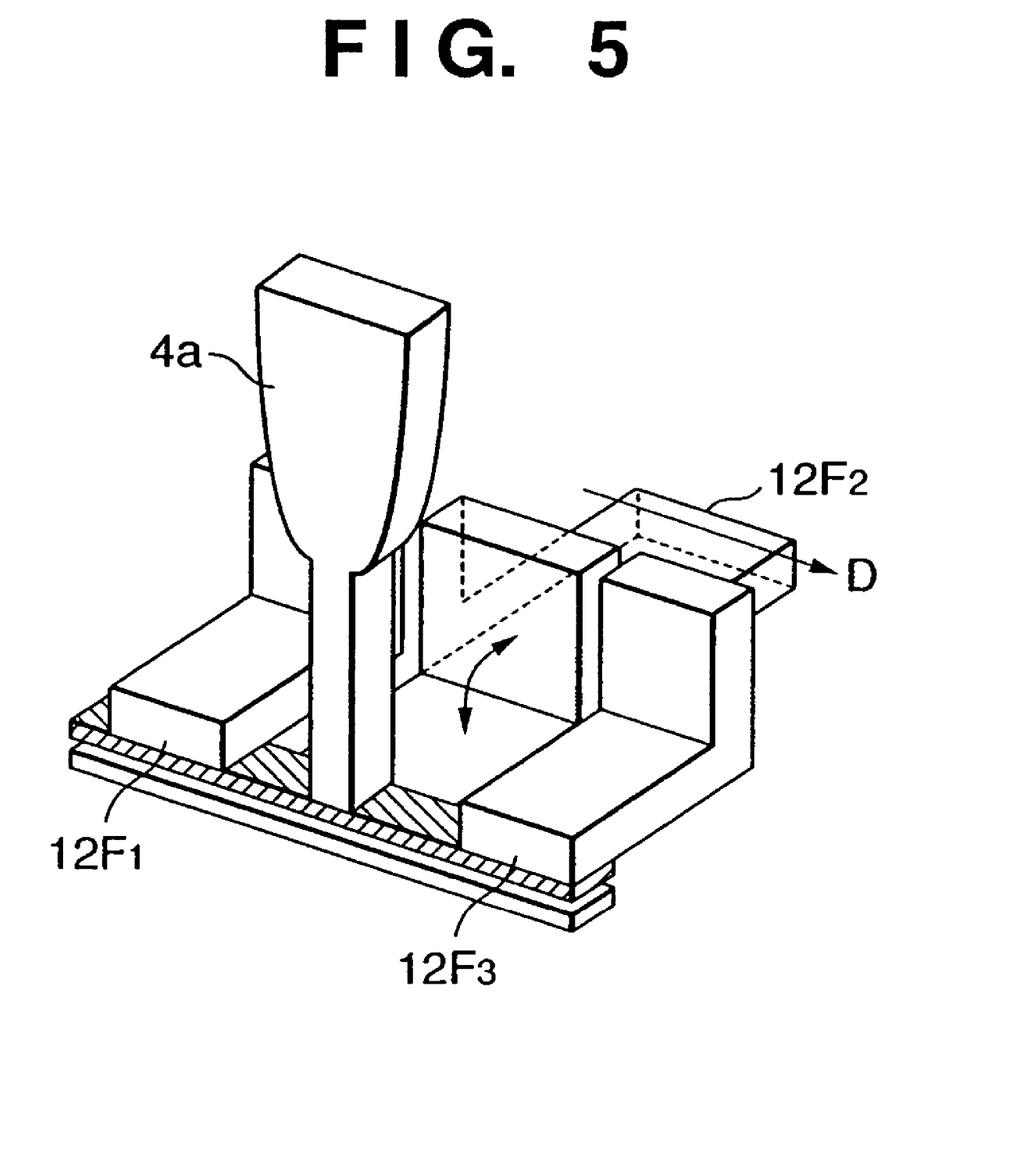
FIG. 5 is a view for explaining operation.

When the press member 12F2 is retreated, the vibrator 4a can be moved downward onto the brim 2B of the lid 2A at the ● position and be pressed against it (see FIG. 5).

The control means of the ultrasonic welding apparatus is actuated to cause the vibrator 4a to generate vibration with a frequency of 48 kHz. Upon transmission of the vibration, that portion of the lid member 2 which is in contact with the vibrator 4a generates heat to increase its temperature. Press members 12F1 and 12F2 on the two sides adjacent to the retreated press member 12F2 press the brims 2B and 1C of the lid member 2 and container main body 1, thus welding the brims 2b and 1C.

When the vibration of the vibrator 4a with the above frequency is transmitted, that portion of the lid member 2 which is in press contact against the vibrator 4a reaches as high as 80° C. to 300° C., and is melted.

Interlocked with the oscillation of the vibrator 4a, the press member 12F3 adjacent to the central press member 12F2 of the holding means 12 is released, and is retreated from the press position.

Figure 6:
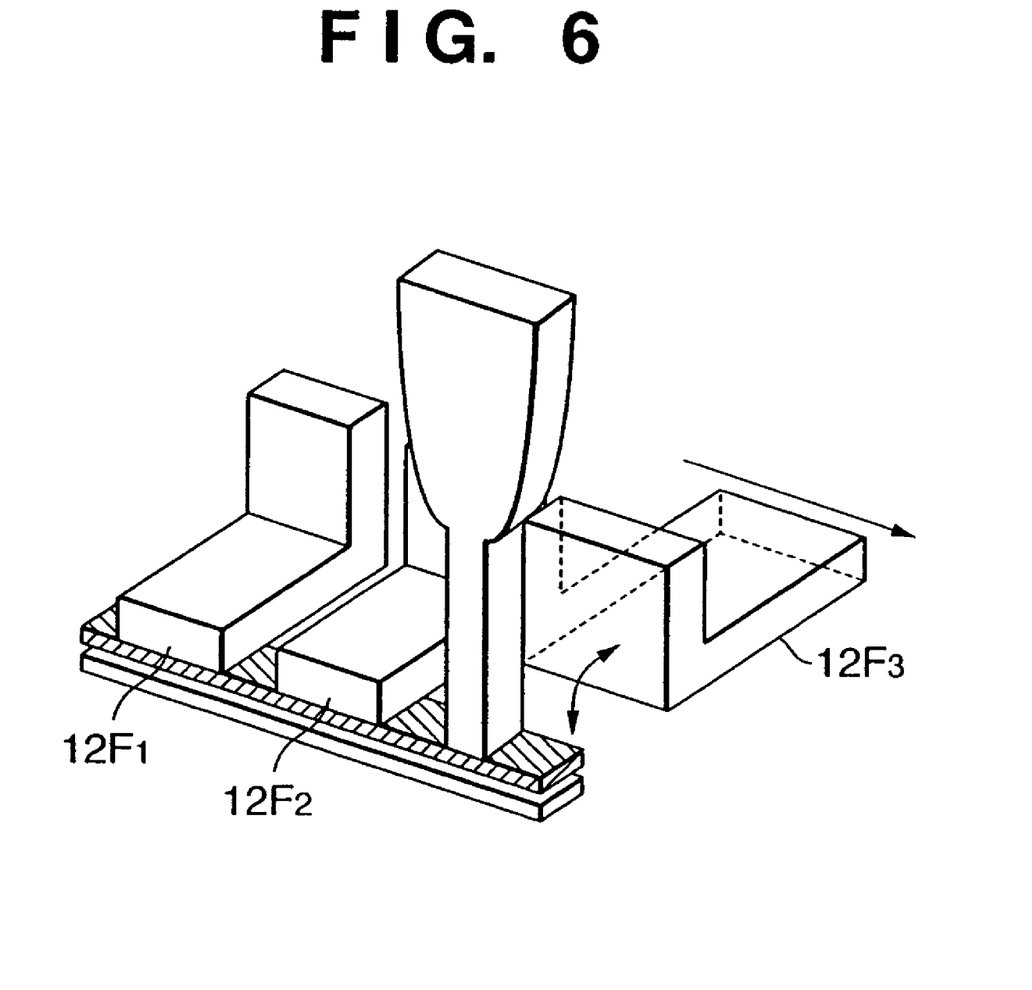
FIG. 6 is a view for explaining operation.

Interlocked with the retreat of the press member 12F3, the vibrator 4a moves as shown in FIGS. 5 and 6 along the welding moving locus shown in FIG. 2, and the welding operation of the brims 2B and 1C of the lid member 2 and container main body 1 is performed along the line of the moving locus indicated by the broken line.

Interlocked with the movement from the position of the vibrator 4a shown in FIG. 5 to the position of the vibrator 4a shown in FIG. 6, the press member 12F2 retreated in FIG. 5 returns to the initial press position.

Upon this operation, when the welding operation of the brims 2B and 1C of the long sides of the lid member 2 and container main body 1 welded at the position of FIG. 5 reaches the end position, the transfer angle of the ultrasonic welding means 4 is changed by the moving means 14. The ultrasonic welding means 4 thus moves to the short-side portions of the brims. Retreat and return of the press members are repeated, as described with reference to FIGS. 4, 5, and 6, so that the brims 2B and 1C of the lid member 2 and container main body 1 are sequentially welded.

In this example, the size of the long-side portion was set to 220 mm, and the moving speed of the vibrator 4a was set to 120 mm/sec.

The welding operation shown in FIGS. 4, 5, and 6 is performed along the two long-side portions and two short-side portions of the lid member 2 from the start position indicated by the ● point to the end position indicated by the ▲ point shown in FIG. 2 throughout the brims by one turn, so that the lid member 2 can be welded to the container main body 1.

As described above, a bonding method for a plurality of components, of heat-welding the plurality of components such as a lid member and container main body in a predetermined lengthwise direction by vibration of an ultrasonic vibrator can be proposed, characterized in that the plurality of components are fixed such that bonding positions thereof are aligned, the ultrasonic vibrator is oscillated, and the plurality of components and the ultrasonic vibrator are moved relative to each other in the lengthwise direction, thus performing heat welding.

As described in the above embodiment, a bonding method for a plurality of components can be performed, characterized in that the plurality of components such as the lid member and container main body are fixed in the lengthwise direction with a plurality of fixing members, and as the ultrasonic vibrator moves, the fixing members are retreated from the bonding positions.

A bonding method for a plurality of components could be performed, characterized in that the fixing members retreated from the bonding positions are returned, and fix a portion which is heat-welded by the ultrasonic vibrator.

In the above embodiment, a bonding method for a plurality of components, of heat-welding the plurality of components such as a lid member and container main body in a predetermined lengthwise direction by vibration of an ultrasonic vibrator could be proposed, characterized in that the components are fixed in the predetermined longitudinal direction with a plurality of fixing members that fix the components, the ultrasonic vibrator is operated to move from a welding start position in the predetermined lengthwise direction, and as the ultrasonic vibrator moves, the fixing members are retreated from fixing positions.

A bonding method for a container and lid member, of closing an opening of the container with the lid member can be proposed, characterized in that the lid member is placed over the opening of the container, an ultrasonic vibrator is brought into contact with the lid member and is oscillated in order to bond the periphery of the opening, and the container or the ultrasonic vibrator is moved relative to the periphery of the opening, thus performing heat welding.

The above embodiment can perform a bonding method for a container and lid member, characterized in that the lid member placed over the container is fixed at prospective bonding positions with a plurality of fixing members, and the fixing members are retreated from the prospective bonding positions in accordance with movement of the ultrasonic vibrator.

The above embodiment can perform a bonding method for a container and lid member, characterized in that the fixing members retreated from the prospective bonding positions are returned to the prospective bonding positions after heat welding by means of ultrasonic vibration.

(Second Embodiment)

Figure 7:
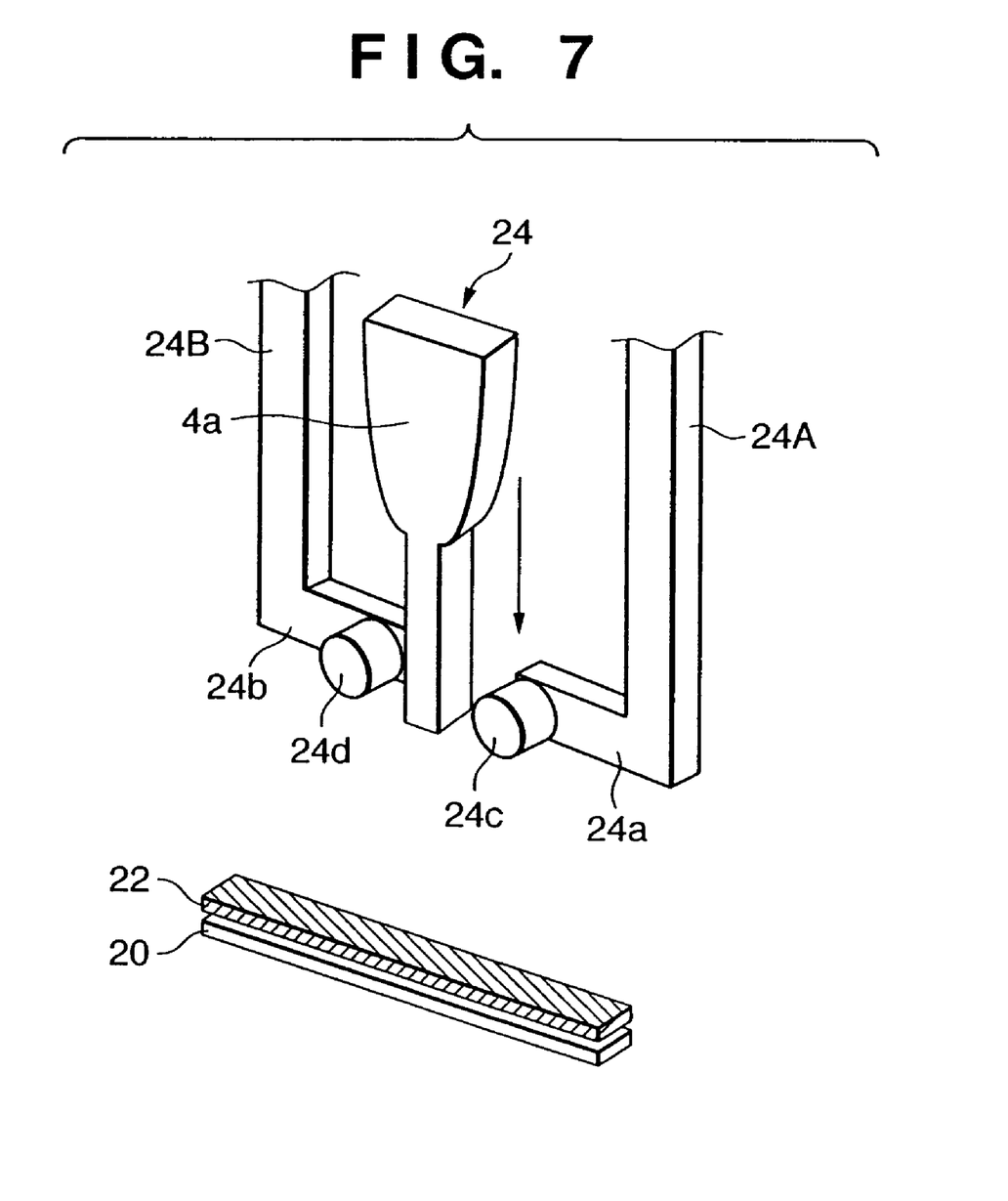
FIG. 7 is a view for explaining another embodiment.
Figure 8:
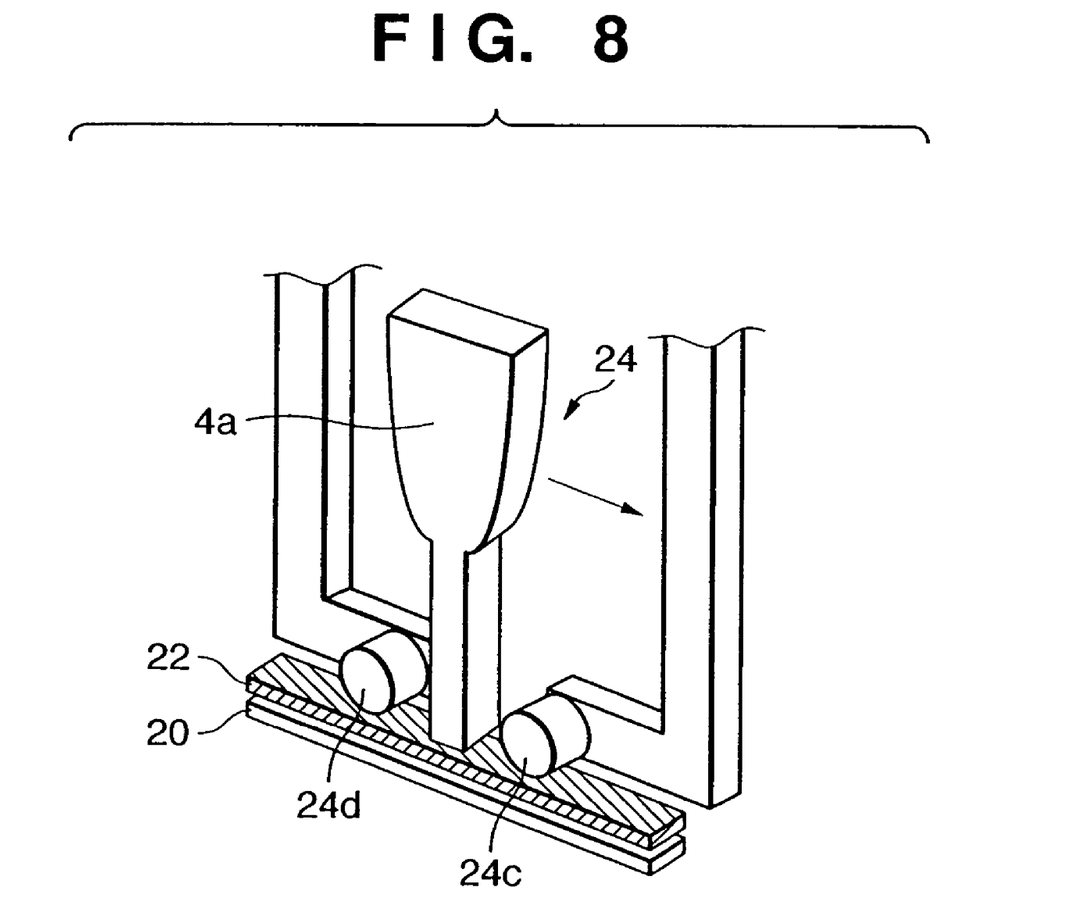
FIG. 8 is a view for explaining the embodiment in FIG. 7.
Figure 9:
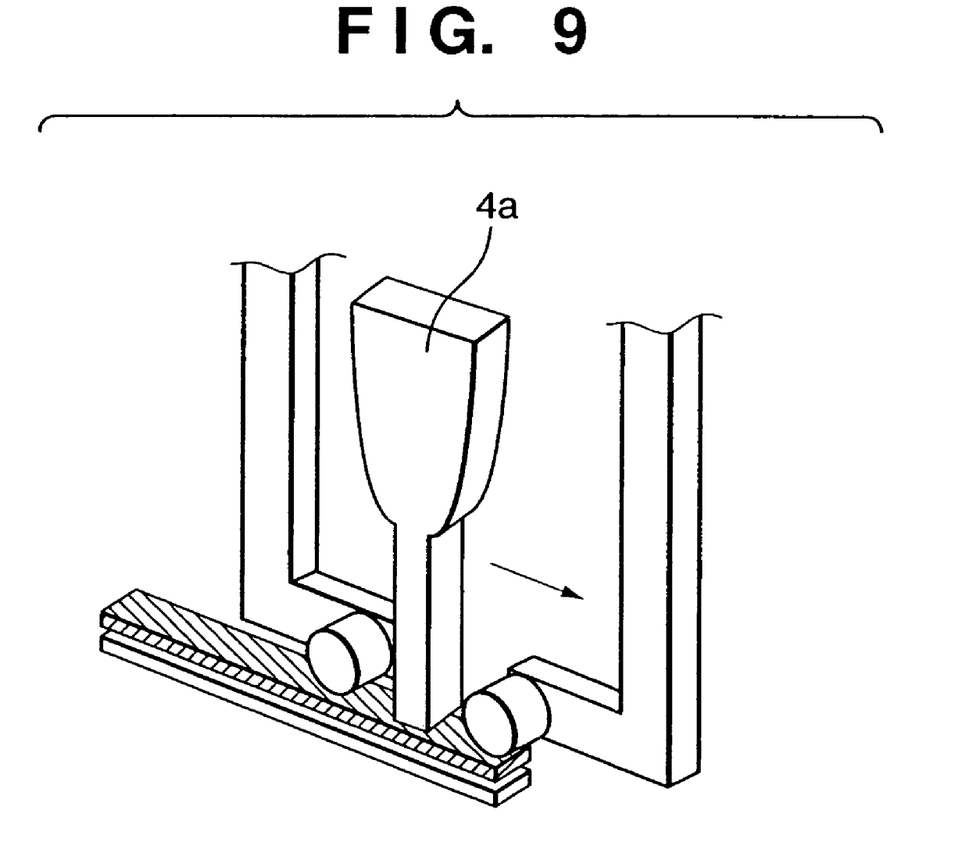
FIG. 9 is a view for explaining the embodiment in FIG. 7.

FIGS. 7 to 9 are views for explaining the second embodiment of the present invention.

According to this embodiment, a plurality of to-be-bonded members 20 and 22 are overlaid on each other and are subjected to ultrasonic welding.

This embodiment shows a case in which other examples of the press members of the holding means 6, 8, 10, and 12 shown in the first embodiment are used.

Referring to FIG. 7, reference numeral 24 denotes a work holding means of this embodiment; 24A and 24B, Y-shaped arm members attached to an attaching member 4E of an ultrasonic welding means 4 identical to that shown in FIG. 2.

The lower ends of the arm members 24A and 24B form L-shaped angles 24a and 24b.

Work press rollers 24c and 24d are attached to the angles 24a and 24b, respectively.

An ultrasonic vibrator 4a moves vertically between the angles 24a and 24b.

In FIG. 8, the works 20 and 22 are placed on a work holding base (not shown). The work holding means 24 is moved downward, to hold the work in a held state while pressing it with the work press rollers 24c and 24d.

When the ultrasonic vibrator 4a is oscillated, the vibrated portion of the work 22 generates heat to increase its temperature, so that the vibrated portion of the work 22 is melted.

Since the work 22 is pressed by the work press rollers 24c and 24d at its positions before and after the molten portion, the members 20 and 22 are bonded to each other.

At the position of FIG. 8, as oscillation, melting, and bonding progress, both the vibrator 4a and work holding means 24 are moved by a moving means 14 in a direction shown in FIGS. 8 and 9.

When the vibrator 4a is oscillated and moved continuously, the works 20 and 22 are welded and bonded to each other continuously along with the movement of the vibrator 4a and work press rollers 24c and 24d.

(Third Embodiment)

Figure 10:
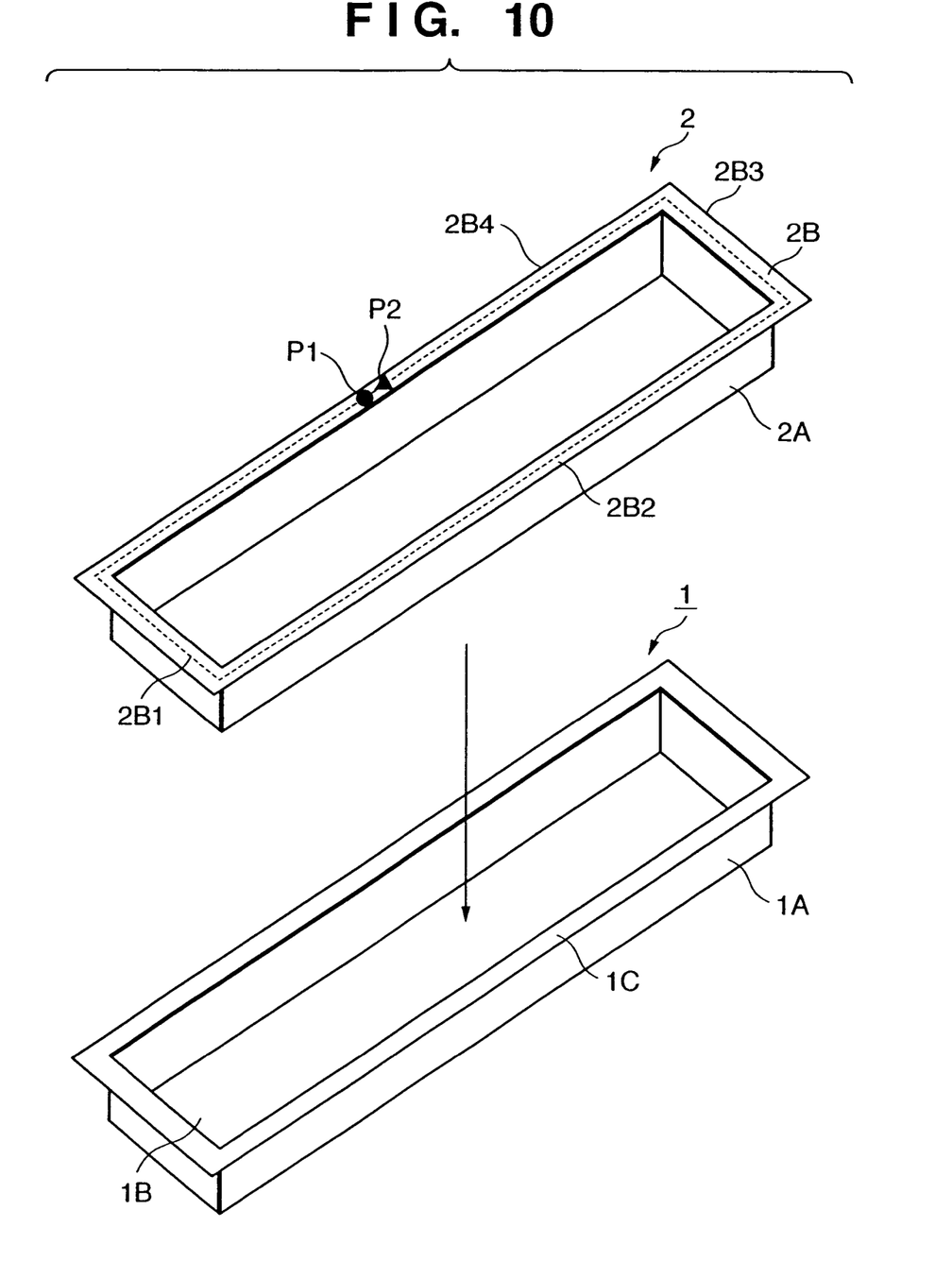
FIG. 10 is a view for explaining still another embodiment.

FIG. 10 is a view showing the third embodiment of the present invention.

Assume that, as shown in FIG. 10, a lid member 2 is to be placed over a container opening 1B, and that respective brims 1C and 2B are to be bonded, while being held by pressure with holding means, from a molten state caused by ultrasonic oscillation of an ultrasonic vibrator via holding operation of the holding means. In the above embodiment, ultrasonic welding and bonding progress from a welding start position P1 along the moving locus of the vibrator. In the vicinity of the end point position, of that portion of the work where the brim of the container and the brim of the lid member are overlaid, the length of the portion which is vibrated by the vibrator decreases gradually.

More specifically, as the work is bonded at the welding start point P1, the vibration is limited there. The rear portion of the work to where the vibrator moves backward is also bonded, and accordingly vibration is also limited there.

Hence, as the vibrator approaches the end point position, the area where vibration is generated becomes narrow.

Then, sometimes heat generation, temperature increase, and welding operation caused by oscillation cannot occur sufficiently.

This embodiment shows an example in which this problem is solved. The moving speed of the vibrator is decreased from a position before a welding end point P2, so that the temperature rises sufficiently, thus ensuring welding.

More specifically, this embodiment is achieved by a bonding method for a container and lid member, of closing an opening of the container with the lid member, characterized in that when the lid member is to be placed over the opening of the container, the ultrasonic vibrator is to be brought into contact with the lid member and is to be oscillated in order to bond the periphery of the opening, and the container or the ultrasonic vibrator is to be moved relative to the periphery of the opening when performing heat welding, a relative moving speed in the vicinity of the bonding end position of the opening is decreased.

In this embodiment, the thicknesses of the ribs of the container and lid member were set to 1.5 mm, their widths were set to 5.0 mm, and the moving speed from the welding start position was set to 120 mm/sec. The moving speed was decreased at a position 2.0 cm before the end point position P2 down to a speed of 60.0 mm/sec.

As described above, according to the above embodiment, a bonding method that is not influenced by the shape of a to-be-bonded component can be obtained by a bonding method for a plurality of components, of heat-welding the plurality of components in a predetermined lengthwise direction by vibration of an ultrasonic vibrator, characterized in that the plurality of components are fixed such that bonding positions thereof are aligned, the ultrasonic vibrator is oscillated, and the plurality of components and the ultrasonic vibrator are moved relative to each other in the lengthwise direction, thus performing heat welding.

According to the above embodiment, bonding could be performed reliably with a bonding method for a plurality of components, characterized in that the plurality of components are fixed in the lengthwise direction with a plurality of fixing members, and as the ultrasonic vibrator moves, the fixing members are retreated from the bonding positions.

The bonding accuracy could be improved by a bonding method for a plurality of components, characterized in that the fixing members retreated from the bonding positions are returned, and fix a portion which is heat-welded by the ultrasonic vibrator.

A bonding method for a plurality of components, of heat-welding the plurality of components in a predetermined lengthwise direction by vibration of an ultrasonic vibrator could be obtained, characterized in that the components are fixed in the predetermined longitudinal direction with a plurality of fixing members that fix the components, the ultrasonic vibrator is operated to move from a welding start position in the predetermined lengthwise direction, and as the ultrasonic vibrator moves, the fixing members are retreated from fixing positions.

Also, the air tightness of the container can be ensured by a bonding method for a container and lid member, of closing an opening of the container with the lid member, characterized in that the lid member is placed over the opening of the container, an ultrasonic vibrator is brought into contact with the lid member and is oscillated in order to bond the periphery of the opening, and the container or the ultrasonic vibrator is moved relative to the periphery of the opening, thus performing heat welding.

The bonding accuracy of the container could be obtained by a bonding method for a container and lid member, characterized in that the fixing members retreated from the prospective bonding positions are returned to the prospective bonding positions after heat welding by means of ultrasonic vibration.

Any influence of the shape of the container could be eliminated by a bonding method for a container and lid member, of closing an opening of the container with the lid member, characterized in that when the lid member is to be placed over the opening of the container, the ultrasonic vibrator is to be brought into contact with the lid member and is to be oscillated in order to bond the periphery of the opening, and the container or the ultrasonic vibrator is to be moved relative to the periphery of the opening when performing heat welding, a relative moving speed in the vicinity of the bonding end position of the opening is decreased.

According to the above embodiment, any influence of the shape of the to-be-welded and bonded portion could be eliminated by an ultrasonic welding apparatus for heat-welding a plurality of components by oscillation of an ultrasonic vibrator, characterized by comprising a plurality of fixing means for fixing the plurality of components at prospective welding positions, and means for retreating the fixing means from the prospective welding positions during movement of the ultrasonic vibrator to the prospective welding positions.

As many apparently widely different embodiments of the present invention can be made without departing from the spirit and scope thereof, it is to be understood that the invention is not limited to the specific embodiments thereof except as defined in the appended claims.

What is claimed is:

1. A bonding method for a plurality of components, of heat-welding the plurality of components in a predetermined lengthwise direction by vibration of an ultrasonic vibrator, wherein the plurality of components are fixed such that bonding positions thereof are aligned, said ultrasonic vibrator is oscillated, and the plurality of components and said ultrasonic vibrator are moved relative to each other in the lengthwise direction, thus performing heat welding, wherein the plurality of components are fixed in the lengthwise direction with a plurality of fixing members, and as said ultrasonic vibrator moves, said fixing members are retreated from the bonding positions.

2. The method according to claim 1, wherein said fixing members retreated from the bonding positions are returned, and fix a portion which is heat-welded by said ultrasonic vibrator.

3. A bonding method for a plurality of components, of heat-welding the plurality of components in a predetermined lengthwise direction by vibration of an ultrasonic vibrator, wherein the components are fixed in the predetermined longitudinal direction with a plurality of fixing members that fix the components, said ultrasonic vibrator is operated to move from a welding start position in the predetermined lengthwise direction, and as said ultrasonic vibrator moves, said fixing members are retreated from fixing positions.

4. A bonding method for a container and lid member, of closing an opening of the container with the lid member, wherein the lid member is placed over the opening of the container, an ultrasonic vibrator is brought into contact with the lid member and is oscillated in order to bond a periphery of the opening, and the container or said ultrasonic vibrator is moved relative to the periphery of the opening, thus performing heat welding, wherein the lid member placed over the container is fixed at prospective bonding positions with a plurality of fixing members, and said fixing members are retreated from the prospective bonding positions in accordance with movement of said ultrasonic vibrator.

5. The method according to claim 4, wherein said fixing members retreated from the prospective bonding positions are returned to the prospective bonding positions after heat welding by means of ultrasonic vibration.

6. An ultrasonic welding apparatus for heat-welding a plurality of components by oscillation of an ultrasonic vibrator, comprising a plurality of fixing means for fixing the plurality of components at prospective welding positions, and means for retreating said fixing means from the prospective welding positions during movement of said ultrasonic vibrator to the prospective welding positions.

7. The apparatus according to claim 6, further comprising means for returning said fixing means to fixing positions after heat welding at the prospective welding positions.

8. The apparatus according to claim 7, further comprising control means for decreasing a moving speed of said ultrasonic vibrator before a prospective welding end position when the prospective welding positions form a closed loop.

* * * * *

UNITED STATES PATENT AND TRADEMARK OFFICE
CERTIFICATE OF CORRECTION

PATENT NO.        : 6,966,957 B2
APPLICATION NO.   : 10/817801
DATED             : November 22, 2005
INVENTOR(S)       : Kazuo Tsuchihashi

It is certified that error appears in the above-identified patent and that said Letters Patent is hereby corrected as shown below:

COLUMN 1:

Line 30, "No." (second occurrence) should be deleted.

Signed and Sealed this

Twelfth Day of August, 2008

JON W. DUDAS
*Director of the United States Patent and Trademark Office*